United States Patent [19]

Byrns

[11] Patent Number: 4,703,853

[45] Date of Patent: Nov. 3, 1987

[54] BLOW-MOLDED THREE SECTION STORAGE CASE

[76] Inventor: James E. Byrns, 1027 2nd Ave., South, Clinton, Iowa 52732

[21] Appl. No.: 901,149

[22] Filed: Aug. 28, 1986

[51] Int. Cl.⁴ ............................................. B65D 85/67
[52] U.S. Cl. .................................... 206/387; 220/339; 220/420; 220/469; 206/509
[58] Field of Search ................ 206/387; 220/337, 339, 220/420, 427, 469; 229/DIG. 4; 264/524

[56] References Cited

U.S. PATENT DOCUMENTS

| | | | |
|---|---|---|---|
| 3,122,300 | 2/1964 | Bombard | 229/DIG. 4 X |
| 3,317,955 | 5/1967 | Schurman et al. | 264/524 X |
| 3,441,071 | 4/1969 | Schurman et al. | 220/469 X |
| 3,596,822 | 8/1971 | Holley | 220/339 X |
| 3,896,929 | 7/1975 | Mills | 220/469 X |
| 4,005,800 | 2/1977 | Schurman | 220/469 X |
| 4,078,657 | 3/1978 | Schurman | 220/1 A X |
| 4,153,178 | 5/1979 | Weavers | 220/306 |
| 4,268,555 | 5/1981 | Kantz | 229/DIG. 4 X |
| 4,294,558 | 10/1981 | Errichiello | 220/339 X |
| 4,407,410 | 10/1983 | Graetz et al. | 220/339 X |
| 4,518,275 | 5/1985 | Rauch, III et al. | 206/387 X |
| 4,635,797 | 1/1987 | Bankier | 206/387 X |

FOREIGN PATENT DOCUMENTS 2038164 7/1980 United Kingdom ................ 220/339

Primary Examiner—William Price
Attorney, Agent, or Firm—Thomas J. Greer, Jr.

[57] ABSTRACT

A storage case for a video cassette. The case is in the general form at a book and is openable to a flat condition. A hollow wall, blow-molded construction imparts structural rigidity to the case and also provides shock resistance for its contents. The case is formed by blow molding a single, unitary, hollow parison of a thermoplastic material and then pressing two parallel portions of the blow-molded article to form living hinges. Integral resilient latch elements hold the case closed yet permit easy reopening. The case is formed in an essentially single operation.

9 Claims, 4 Drawing Figures

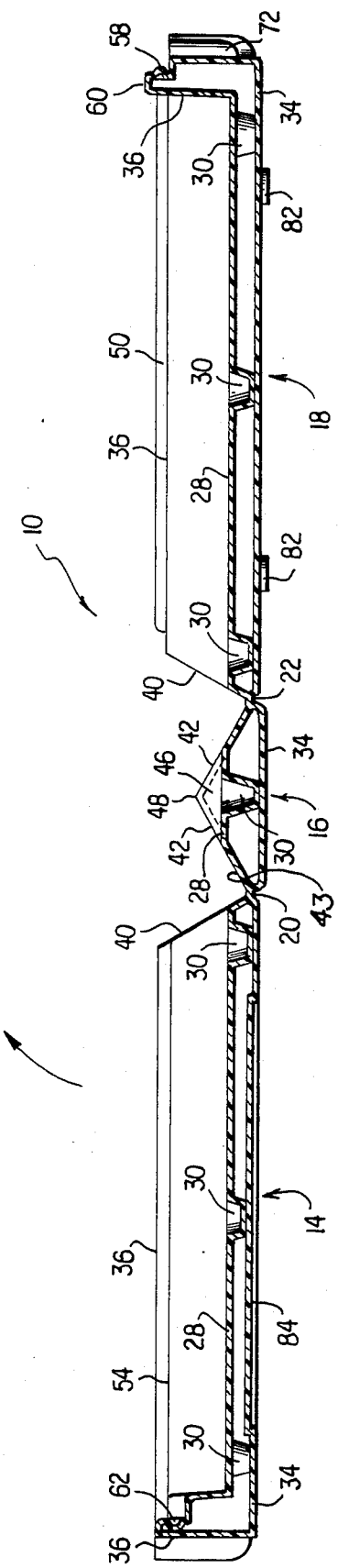
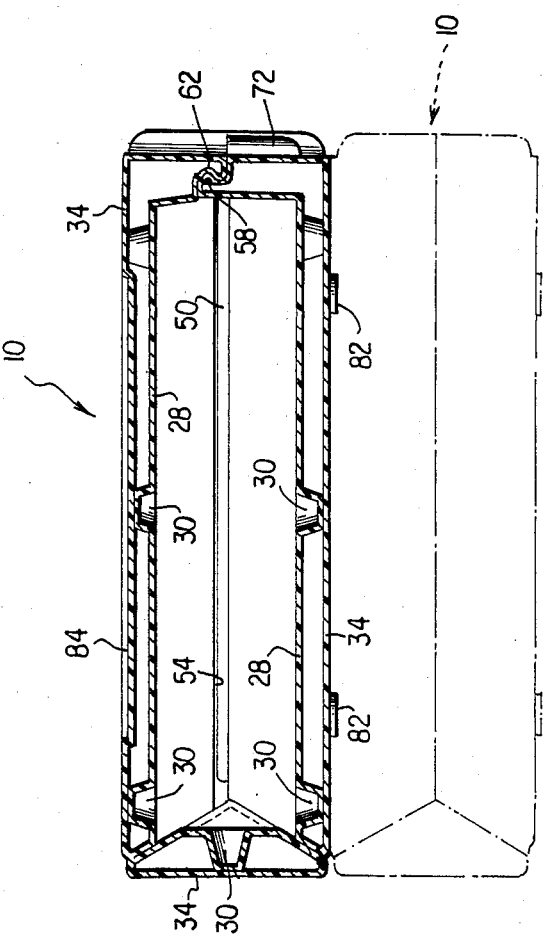
FIG.3
FIG.4

BLOW-MOLDED THREE SECTION STORAGE CASE

BACKGROUND OF THE INVENTION

This invention relates to a thermoplastic hinged case, particularly adapted to contain and store a video cassette. In general, hinged cases of plastics material, for holding a reel of film or the like are known, as may be seen by reference to U.S. Pat. Nos. 4,153,178 issued to Weavers; 3,596,822 issued to Holley; and 4,078,657 issued to Schurman. While apparently satisfactory for the purpose intended, the constructions of these three typical prior art constructions are somewhat expensive to fabricate do not possess the desired shock resistance to protect the contents from omni-directional shocks.

SUMMARY OF THE INVENTION

According to the practice of this invention, a reclosable storage case, particularly adapted for storing and holding a video cassette, as defined by three sections hinged together so as to form, when closed, a rectangular parallelepiped as in the manner of a book. The storage case is fashioned from a single theremoplastic parison by blow molding. The case is easily openable to a flat condition, thereby facilitating removable of and reinsertion of the contents.

DESCRIPTION OF THE DRAWINGS

FIG. 3 is a sectional view taken along section 3—3 of FIG. 2.

FIG. 4 is a cross-sectional view of the case in its closed configuration, and also illustrates a stacking feature of the case.

DESCRIPTION OF THE DRAWINGS

A brief description will first be offered as to the manner of formation of fabrication of the case to thereby faciliatate a greater understanding of the invention. A parison of a thermoplstic material, such as polyethylene or polypropylene, is placed into a blow-molding apparatus. The parison is in the general form of a flat bag. The die cavity of the apparatus which receives the parison is now closed, with certain abutment portions of the apparatus closing the open end of the parison. In accordance with known techniques of blow-molding, air at approximately 80-90 pounds pressure is injected into the interior of the now closed parison, with the result that the walls of the parison are forced in opposite directions against the contour of the die in the blow-molding apparatus. Then, a pair of parallel abutment surfaces in the die is forced against a central portion of the parison causing parallel zones of the hollow parison walls to abut and join each other along parallel, essentially line contact zones, to thereby define a pair of living hinges. The molding apparatus is now opened with the result that the case of this invention has been formed in essentially a single operation from a single parison.

Figure 1:
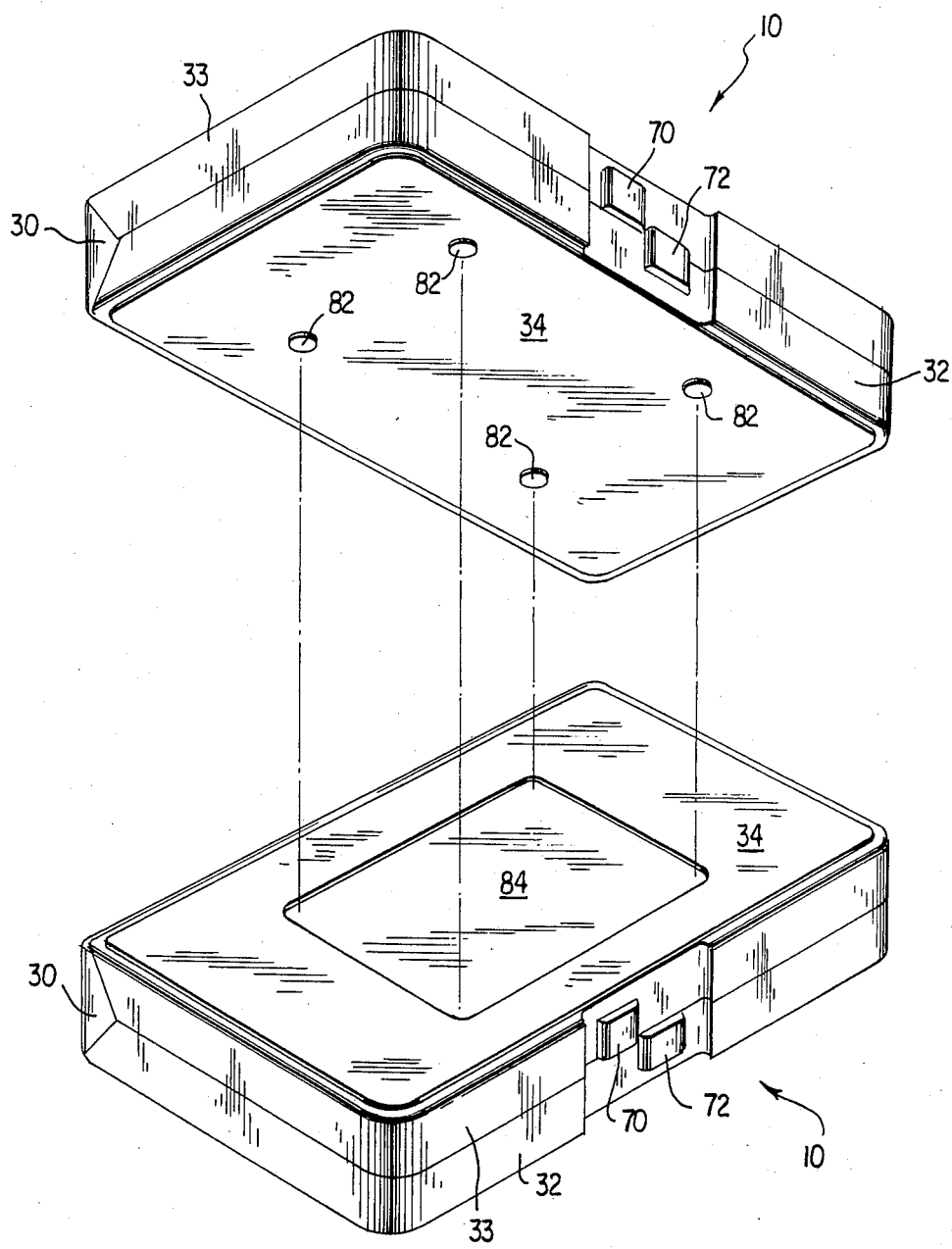
FIG. 1 is a perspective view of the storage case of this invention and illustrates a stacking feature of the case.

Referring now to FIG. 1 of the drawings, the numeral 10 denotes generally the case, shown in its closed configuration. A second case is also shown at FIG. 1, with the vertically directed, dashed lines indicating a stacking feature of the case which will later be described.

Figure 2:
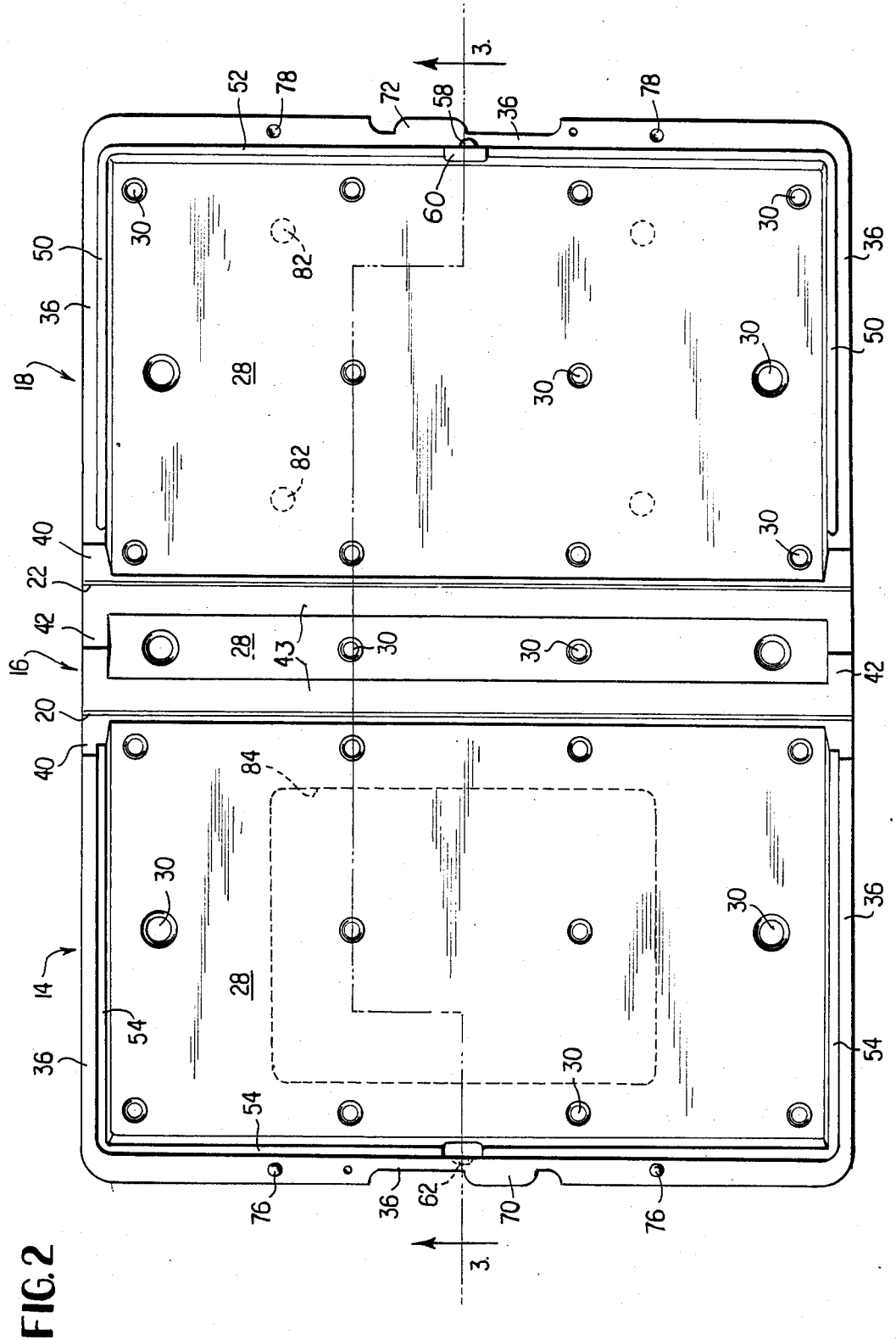
FIG. 2 is a plan view of the inside of the case when it is in its fully opened position.

Referring now particularly to FIG. 2 of the drawings, the numeral 14 denotes a generally rectangular double wall end panel hingedly connected to a generally rectangular double wall central panel, denoted by the numeral 16, with a second double wall end panel, denoted by the numeral 18, also hingedly connected to the central panel 16. Living hinge 20 couples central panel 14 to panel 16, while living hinge 22 couples central panel 16 to end panel 18. As used by workers in this art, the term "living hinge" refers to a hinge in a plastics material article formed from the plastics material itself.

Referring now particularly to FIG. 3, the reader will now be in a position to more fully comprehend the manner in which the living hinges 20 and 22 have been formed, namely, by pressing together the upper and lower walls of the case, these having been originally the upper and lower walls of the parison. The numeral 28 denotes the inner wall or surface of the case, and extends from the left end panel 14, across the central or middle panel 16 and then across to and defining the inner surface or wall of the right-hand panel 18. A plurality of downwardly extending nodules 30, deformed from and an integral with wall 28, bears against opposite or lower wall 34, wall 34 conveniently being regarded as the lower surface of the original parison used to form the storage case of this invention. The numeral 36 denotes an upstanding and hollow peripheral edge wall around three of the four edges of each end panel 14, 18. The free or terminal ends of these walls, as view at FIG. 2, are canted or sloped as indicated by the numeral 40 in the area immediately adjacent a respective living hinge 20, 22. A complementary cant or slope is provided on the ends of central panel 16 inside of or between the living hinges 20, 22. As shown by the dashed lines at FIG. 3, the upper and lower non-hinged edges of central panel 16 are hollow and each form a generally triangular element denoted by the numeral 46, there being one such element 46 at each non-hinged end of central panel 16. The numeral 48 denotes the apex of each of these triangular portions. Thus, the central panel includes a 16 triangular and hollow portion 46 at each of its non-hinged edges. The sloping sides of triangular end portions 46 are denoted by the numeral 42. The numeral 43 denotes the sloping (upper, as viewed at FIG. 3) sides of hollow central panel 16 which extend parallel to the living hinges 20, 22. The central (upper, as viewed at FIG. 3) portion of panel 16, bordered by canted surfaces 42 and 43, is flat except for several nodules 30. The slope of sides 42 and 43 is the same.

An upstanding sealing and waterproofing bead 50 or rib extends around and on top of the three non-hinged walls of right-hand edge panel 18 and fits, when the case is closed, into complementary receesses 54 on upstanding hollow wall 36 of left-handed panel 14. A latching nodule 58 is formed on an other side of enlarged portion 60 (see FIGS. 2 and 3), the latter integral with upstanding rib 52, with nodule 58 fitting into a complementary recess 62 which borders on recess 54 in panel 14. Projections 70 and 72 are formed on respective end panels 14 and 18 and serve as finger abutment elements to open the case. The case is maintained normally in a closed condition by the resiliency of nodule 58 fitting into its complementary recess 62. To assist in aligning the two rectangular end panels, left-hand panel 14 is provided with a pair of upstanding nodules 76 which fit into complementary recesses 78 of right-hand end panel 18, as best shown at FIG. 2.

The lower surface of panel 18, as viewed at Figure 3, is provided with four downwardly extending and integral nodules 82, also shown at FIG. 1, which fit into the corners of a recess 84, the latter being formed at the bottom of left-hand panel 14. A consideration of both FIGS. 1 and 4 will enable the reader to easily understand that nodules 82 fitting into the corners of recess 84 provide a stacking feature, whereby similar cases 10 may be stacked and are thus inhibited from sliding relative to each other.

The reader can now visualize that in the closed condition of the case, the hollow walls in each of the central panel, the two end panels and the three upstanding walls carried by each of the end panels provide omnidirectional shock protection for the contents of the container, the contents typically being a video cassette. Further, the use of the sloping or canted and mating services 40, 42 and 43 do away with 90-degree edges which might cause accidental damage to the contents of the case when the contents are either removed or inserted. The shock-resistant case of this invention is in the general form of a book which is readily opened into a completely flat condition, thus providing ready access to and replacement of the contents of the case.

I claim:

1. A plural parcel, reclosable storage case for storing one or more articles therein, such as a video cassette, the case defined by two substantailly identical, rectangular end panels, joined together by a central rectnagular panel, the two end panels and the central panel each being of a hollow, double wall construction, one edge of each end panel being hingedly connected to a respective opposite edge of the central panel, to thereby define three serially connected, aligned panels, at least one of the end panels having upstanding edge walls on its non-hinge connected edges, the end panels and the central panel formed from a single bland of a thermoplastic material, the end panels and central panel defining a rectangular parallelpiped case which is openable to a flat condition.

2. The case of claim 1, wherein the edge walls are also hollow.

3. The case of claim 2, wherein both of the end panels have upstanding edge walls.

4. The case of claim 3, wherein the opposite, non-hinged edges of the central panel are each provided with upstanding, triangular wall, those ends of the upstanding edge walls of the end panels which are nearest the central panel being slanted so as to be complementary to a respective edge of a respective upstanding triangular wall.

5. The case of claim 4, wherein the upstanding triangular walls are hollow.

6. The case of claim 4, wherein all of the hollow walls are of the same thickness.

7. The case of claim 4, wherein the height of the upstanding, triangular walls, as measured from the central panel, is greater than the wall thickness of the central panel.

8. The case of claim 7, wherein the hinge connections between the central panel and the two edge panels are living hinges.

9. The case of claim 1, wherein the hinge connections between the central panel and the two edge panels are living hinges.

* * * * *